(12) United States Patent
Klotblixt et al.

(10) Patent No.: US 11,292,092 B2
(45) Date of Patent: Apr. 5, 2022

(54) ELECTRIC PULSE TOOL

(71) Applicant: ATLAS COPCO INDUSTRIAL TECHNIQUE AB, Stockholm (SE)

(72) Inventors: Adam Klotblixt, Stockholm (SE); Carl Johan Nåsell, Enskede (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 341 days.

(21) Appl. No.: 16/614,315

(22) PCT Filed: May 14, 2018

(86) PCT No.: PCT/EP2018/062345
§ 371 (c)(1),
(2) Date: Nov. 15, 2019

(87) PCT Pub. No.: WO2018/210730
PCT Pub. Date: Nov. 22, 2018

(65) Prior Publication Data
US 2020/0189048 A1    Jun. 18, 2020

(30) Foreign Application Priority Data

May 17, 2017   (SE) .................................... 1730137-5

(51) Int. Cl.
*B23P 19/06*   (2006.01)
*B25B 21/02*   (2006.01)
*B25B 23/147*   (2006.01)

(52) U.S. Cl.
CPC ............ *B23P 19/066* (2013.01); *B25B 21/02* (2013.01); *B25B 23/1475* (2013.01)

(58) Field of Classification Search
CPC ...... B23P 19/066; B23P 19/065; B25B 21/02; B25B 21/00; B25B 23/1475; B25B 23/147; B25D 2250/201; B25D 2250/221
(Continued)

(56) References Cited

U.S. PATENT DOCUMENTS 6,680,595 B2 *   1/2004   Ito ....................... B25B 23/1405
                                                            173/11
7,770,658 B2 *   8/2010   Ito ......................... B23P 19/066
                                                            173/1
(Continued)

FOREIGN PATENT DOCUMENTS

EP       0808018 A1     11/1997
FR       3003495 A1     9/2014

OTHER PUBLICATIONS

International Search Report (ISR) and Written Opinion dated Aug. 21, 2018 issued in International Application No. PCT/EP2018/062345.
(Continued)

*Primary Examiner* — Dariush Seif
(74) *Attorney, Agent, or Firm* — Holtz, Holtz & Volek PC

(57) ABSTRACT

An electric pulse tool delivers torque in pulses on an output shaft of the electric pulse tool. The electric pulse tool includes an electric motor with a rotor and a gear arrangement adapted to drive the output shaft. The electrical pulse tool is operative, for each period, to control the speed of the rotor until a play in the gear arrangement is determined to be closed and the gear arrangement starts to move the output shaft.

20 Claims, 1 Drawing Sheet

(58) Field of Classification Search
USPC .......................................................... 173/176
See application file for complete search history.

(56) References Cited

U.S. PATENT DOCUMENTS

| | | | | |
|---|---|---|---|---|
| 2002/0189830 A1* | 12/2002 | Cripe | ................. | B25B 23/1405 173/1 |
| 2006/0185869 A1* | 8/2006 | Arimura | ............. | B25B 23/1475 173/176 |
| 2008/0135269 A1* | 6/2008 | Friberg | ............... | B25B 23/1405 173/93.5 |
| 2010/0000750 A1* | 1/2010 | Andel | ................... | B25B 21/02 173/48 |
| 2013/0014967 A1* | 1/2013 | Ito | ........................... | B25F 5/021 173/93 |
| 2013/0082631 A1* | 4/2013 | Suzuki | ...................... | H02P 6/12 318/461 |
| 2014/0069672 A1* | 3/2014 | Mashiko | ................ | B25B 21/00 173/47 |
| 2014/0158390 A1* | 6/2014 | Mashiko | ................ | B25B 21/00 173/47 |
| 2014/0166326 A1* | 6/2014 | Le Du | ................ | B25B 23/1475 173/181 |
| 2015/0022125 A1* | 1/2015 | Takano | ................... | B25F 5/008 318/139 |
| 2015/0041163 A1* | 2/2015 | McClung | ................ | B25B 21/02 173/1 |
| 2015/0047866 A1* | 2/2015 | Sakai | ....................... | B25F 5/00 173/179 |
| 2015/0135907 A1* | 5/2015 | Hirabayashi | ........ | B25B 23/1475 81/54 |
| 2015/0231770 A1* | 8/2015 | Kusakawa | .......... | B25B 23/1475 173/93.5 |
| 2015/0231771 A1* | 8/2015 | Sakai | ................... | B25B 21/026 173/176 |
| 2015/0282337 A1* | 10/2015 | Ekstrom | ................ | H01H 21/12 173/170 |
| 2016/0325415 A1* | 11/2016 | Huber | .................... | B25B 23/18 |
| 2017/0083014 A1* | 3/2017 | Conrad | .................. | B25B 21/02 |

OTHER PUBLICATIONS

International Preliminary Report on Patentability (IPRP) dated Apr. 25, 2019 issued in International Application No. PCT/EP2018/062345.

* cited by examiner

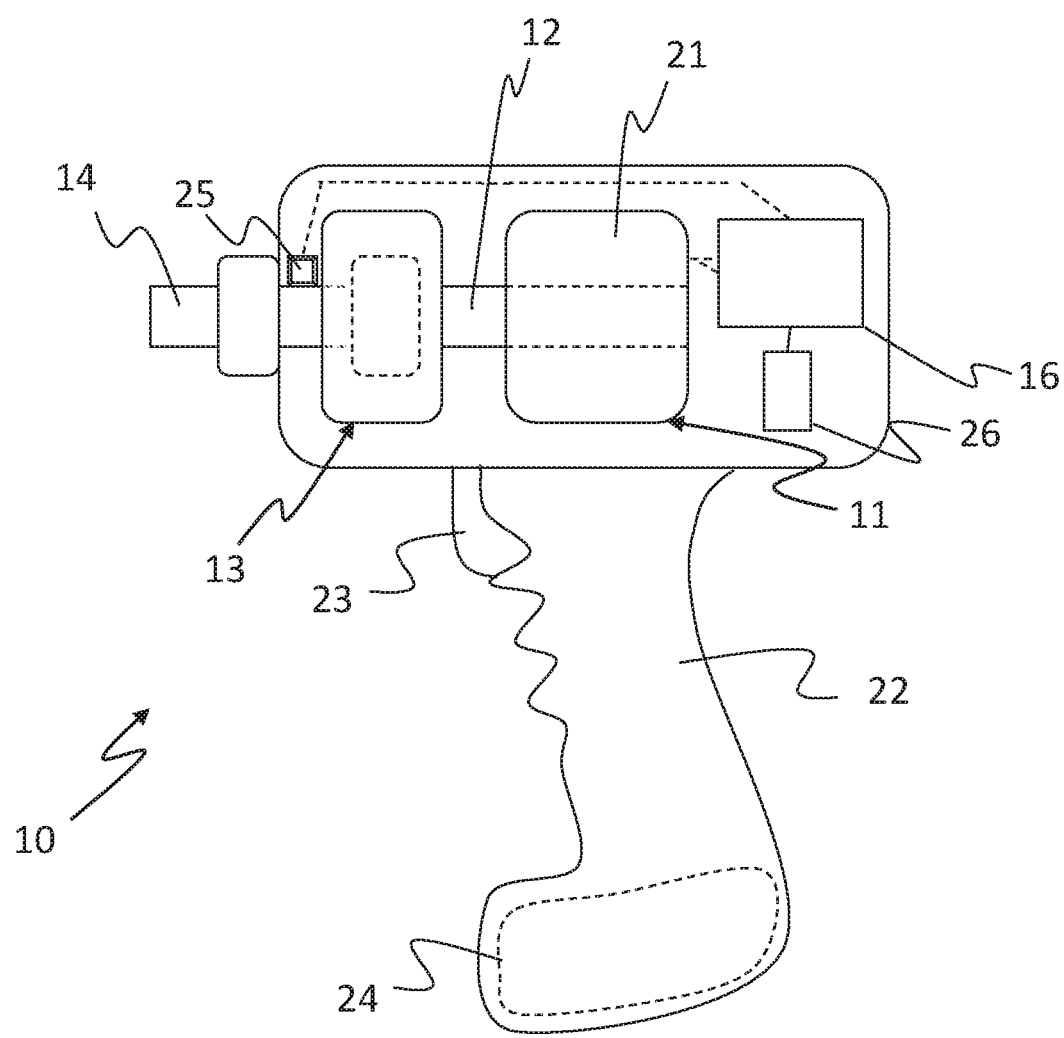

ELECTRIC PULSE TOOL

TECHNICAL FIELD

The invention relates to an electric pulse tool and a method in an electric pulse tool. In particular the invention relates to an electric pulse tool for performing tightening operations where torque is delivered in pulses to e.g. tighten and/or loosen screw joints.

BACKGROUND

Electric power tools for fastening bolts, screws and nuts are used in many different applications. In some of these applications it is desired or even required to be able to control the clamping force or at least an associated torque. Such electric power tools are typically controlled to rotate an output shaft of the electric power tools such that the torque is measured. When the torque reaches a predetermined value the electric power tool is controlled to stop the rotation of the output shaft. This can for example be accomplished by cutting the power to the tool or a clutch can be slid.

A problem encountered when operating electric power tools, in particular a handheld electric power tools, is that the operator is subject to a reaction force. One way to reduce the reaction force transferred to the operator is to use a pulsed electric motor that is fed with a series of energy pulses driving the electric motor in a pulsed manner. The energy can typically be supplied as current pulses. Hereby the reaction force that the operator needs to cope with can be reduced.

U.S. Pat. No. 6,680,595 describes a control method and a fastening apparatus for fastening a screw. The fastening apparatus is controlled to output a pulsed increasing torque. The actual torque is determined and the motor is stopped when the actual torque reaches a target value. The pulsed increasing torque is generated by feeding a pulsed current to the electric motor of the fastening apparatus.

Also, U.S. Pat. No. 7,770,658 describes a control method and a fastening apparatus for fastening a screw. The actual torque is determined and the motor is stopped when the actual torque reaches a target value. Further, when the actual torque reaches a set value the torque delivered by the fastening apparatus is reduced. The pulsed torque is generated by feeding a pulsed current to the electric motor of the fastening apparatus.

There is a constant desire to improve the operation of power assisted fastening tools. For example the pulses do not become well defined. One problem associated with undefined pules is spread in the number of pulses required to reach for instance a target torque.

Hence, there exists a need for an improved pulsed fastening method and an electric pulse tool.

SUMMARY

It is an object of the invention to provide an improved electric pulse tool where the pulses are more clearly defined. This object is achieved in accordance with a first aspect of the disclosure by an electric pulse tool, where torque is delivered in pulses on an output shaft of the electric pulse tool. The electric pulse tool comprises an electric motor with a rotor and a gear arrangement adapted to drive the output shaft. Whereby the electrical pulse tool for each period is operative to control the speed of the rotor until a play in the gear arrangement is determined to be closed and the gear arrangement starts to move the output shaft.

An advantage with exemplary embodiments of the disclosure is that a known kinetic energy for each pulse can be achieved and thus more defined pulses.

BRIEF DESCRIPTION OF THE DRAWINGS

The invention will now be described in more detail and with reference to the accompanying drawings, in which:

FIG. 1 shows a longitudinal section through a power tool.

DETAILED DESCRIPTION

Conventional power tools such as nutrunners or screw drivers are typically provided with sensors, such as angle encoders and/or torque meters, which make it possible to control the quality of a performed work operation, such as the tightening of a joint.

Further, for hand held power tools in particular, it is important both that the reaction force that the operator is subject to is as low as possible and that the time of concluding a specific tightening operation is as short as possible. An operator may conduct many hundreds of tightening operations during a working cycle and it is therefore important that they are both ergonomic for the well-being of the operator and rapid for the productivity at the work station. An ergonomic tightening operation typically implies that the reaction force is as low as possible.

FIG. 1 depicts an exemplary embodiment of an electric pulse tool 10 in accordance with an embodiment of the invention. The tool 10 is configured to perform tightening operations where torque is delivered in a series of pulses to tighten screw joints or a similar action involving a rotational action performed by the tool 10. For this purpose the pulse tool comprises an electric motor 11 having a rotor 12 and a stator 21. The electric motor 11 is arranged to be rotated in two opposite rotational directions, clockwise and counter clockwise.

The tool 10 further comprises a handle 22, which is of a pistol type in the shown embodiment. The invention is however not limited to such a configuration but can be applied in any type of electric pulse tool and not limited to the design of FIG. 1. A power supply 24 is connected to the motor 11. In the embodiment shown the power supply is a battery that can be arranged in the lower part of the handle. Other types of power supplies are also envisaged such as an external power supply supplying power via an electrical cable to the tool 10. The tool 10 can further comprise a trigger 23 arranged for manipulation by the operator to control the powering of the electrical motor 11. In some embodiments the tool 10 is connected to an external control unit (not shown). The external control unit can supply the tool 10 with electrical power. The control unit can also be arranged to transmit and receive signals to/from the tool 10 to control the tool. Further, the tool comprises an output shaft 14.

The invention is applied in an electric pulse tool where the output shaft 14 is connected to the rotor 12 via a gear arrangement 13.

The electric pulse tool 10 further comprise a processor 16 arranged to control the electric motor 11. The electric pulse tool 10 also comprises a memory 26 containing instructions executable by the processor 16. The processor 16 is a Central Processing Unit, CPU, microcontroller, Digital Signal Processor, DSP, or any other suitable type of processor capable of executing computer program code. The memory 26 is a Random Access Memory, RAM, a Read Only Memory, ROM, or a persistent storage, e.g. a single or combination of magnetic memory, optical memory, or solid state memory or even remotely mounted memory.

A sensor 25 is in accordance with one embodiment arranged on the output shaft 14. Alternatively the sensor 25 can be located on the gear arrangement 13. The sensor 25 can however be located on other places in the electric pulse tool 10. According to one exemplary embodiment of the present disclosure the sensor 25 is a torque sensor 25. According to another exemplary embodiment of the present disclosure the sensor 25 is a position sensor 25.

In electric pulse tools according to prior art pulses are created by applying a fixed current during a fixed time to a motor in the power tool. A problem with this method is that the pulses do not become well defined. One problem associated with undefined pules is spread in the number of pulses required to reach for instance a target torque.

However, the inventor has realised that well defined pulses instead can be achieved by controlling the speed of the rotor 12 until a play in the gear arrangement 13 is determined to be closed and the gear arrangement starts to move the output shaft 14. An advantage with this method is that a known kinetic energy for each pulse can be achieved.

Thus the present disclosure according to one aspect relates to an electric pulse tool 10, where torque is delivered in pulses on the output shaft 12 of the electric pulse tool 10. As described above, the electric pulse tool 10 comprises an electric motor 11 with the rotor 12 and the gear arrangement 13 adapted to drive the output shaft 14. Further the electrical pulse tool 10 for each period is operative to control the speed of the rotor 12 until a play in the gear arrangement 13 is determined to be closed and the gear arrangement starts to move the output shaft 14.

In an exemplary embodiment of the electric pulse tool 10 the gear arrangement 13 comprises separate play unit (not shown). In another exemplary embodiment of the electric pulse tool 10 the play unit is separated from the gear arrangement 13. The purpose of this play unit is to add play to the gear arrangement 13. An advantage with a separate play unit is that the amount of play can be chosen. In case a larger play is chosen in the play unit, there will be more time to control the speed before the play in the gear arrangement 13 is determined to be closed.

In one exemplary embodiment of the electric pulse tool 10 the speed is controlled so that a predetermined speed is reached before the play is closed. In this exemplary embodiment is thus a certain amount of kinetic energy corresponding to the predetermined speed built up in the rotor. This known amount of kinetic energy is then unload to the joint.

According to one exemplary embodiment the speed is controlled by provide a current pulse to the electric motor 11 during a predetermined current on time interval. By providing a current pulse to the electric motor 11 during a predetermined current on time interval a certain known speed can be reached. This according to one exemplary embodiment based on previous experience of how of current and speed relate to each other. If the desired speed is not reached with the selected current time interval, the current time interval can be adjusted during the following periods in order to reach the desired speed. According to another exemplary embodiment the speed is constantly measures and the current feed is controlled so that the desired speed is reached. According to another exemplary embodiment the speed is constantly measures and the current feed is controlled so that the desired speed is reached and maintained.

According to one exemplary embodiment of the electric pulse tool 10 the play in the gear arrangement 13 is determined to be closed when the speed of the rotor 12 decreases sufficiently. In this exemplary embodiment the speed is thus used to determine when the play in the gear arrangement 13 has been closed. This principle behind this is when the play in the gear arrangement 13 is closed the gear arrangement starts to move the output shaft 14, which will result in a sufficient speed decrease of the rotor 12.

In a further exemplary embodiment of the electric pulse tool 10 the play in the gear arrangement 13 is determined to be closed when the torque sensed by a torque sensor increases. This principle behind this is when the play in the gear arrangement 13 is closed the gear arrangement starts to move the output shaft 14, which will result an increase of the torque.

In a further exemplary embodiment of the electric pulse tool 10 the play in the gear arrangement 13 is determined to be closed when the current provided to the motor increases. This principle behind this is when the play in the gear arrangement 13 is closed the gear arrangement starts to move the output shaft 14, which will result an increase of the current.

In yet another exemplary embodiment of the electric pulse tool according to the present disclosure the electrical pulse tool is further operative to repeat the periods until a parameter value associated with the tightening of a screw joint has been reached. In an exemplary embodiment of the electric pulse tool according to the present disclosure the parameter value associated with the tightening of a screw joint is torque. In yet another exemplary embodiment of the electric pulse tool according to the present disclosure the parameter value associated with the tightening of a screw joint is angle.

The present disclosure also relates to a computer-readable storage medium, having stored there on a computer program which, when run in the electrical pulse tool 10, causes the electrical pulse tool 10 to be operative as described above.

According to one exemplary embodiment, when the above-mentioned computer program code is run in the processor 16 of the electric pulse tool 10 it causes the electric pulse tool 10 to be operative as described above.

Thus according to one exemplary embodiment the electric pulse tool 10 comprises the processor 16 and the memory 26 containing instructions executable by the processor 16, whereby the electrical pulse tool 10 for each period is operative to control the speed of the rotor 12 until a play in the gear arrangement 13 is determined to be closed and the gear arrangement starts to move the output shaft 14. Further in the embodiment where the electric pulse tool 10 comprises the processor 16 and the memory 26 containing instructions executable by the processor 16, the electrical pulse tool 10 for each period is operative to according to the above exemplary embodiments.

The present disclosure also relates to a method, performed in an electric pulse tool 10 for performing tightening operations according to the above described exemplary embodiments. As in the above described exemplary embodiments, torque is delivered in pulses to tighten a screw joint. As described above, the electric pulse tool 10 comprises an electric motor 11 with the rotor 12 and the gear arrangement 13 adapted to drive the output shaft 14.

Wherein the method for each period comprises the step of controlling the speed of the rotor 12 until a play in the gear arrangement 13 is determined to be closed and the gear arrangement starts to move the output shaft 14.

According to one exemplary embodiment of the method, the speed is controlled so that a predetermined speed is reached before the play is closed. According to another exemplary embodiment the speed is controlled by providing a current pulse to the electric motor 11 during a predetermined current on time interval.

In an exemplary embodiment of the method, the play in the gear arrangement 13 is determined to be closed when the speed of the rotor 12 decreases. According to another exemplary embodiment, the play in the gear arrangement 13 is determined to be closed when the torque sensed by a torque sensor increases.

In an exemplary embodiment of the method the electric pulse tool 10 comprises a position sensor 25 arranged to determine the position change of the rotor and wherein the speed is determined based on the determined position change of the rotor.

In another exemplary embodiment of the method the electrical pulse tool 10 is further operative to repeat the periods until a parameter value associated with a tightening of a screw joint has been reached. In another exemplary embodiment of the method the electrical pulse tool 10 the parameter value associated with the tightening of a screw joint is torque. In yet another exemplary embodiment of the method the electrical pulse tool 10 the parameter value associated with the tightening of a screw joint is angle.

In an exemplary embodiment the pulsed energy supplied to the motor is described as a controlled pulsed current. It is however envisaged that the pulsed energy is controlled based on some other parameter other than current. The term (current) pulse as used herein therefore also includes other types of energy pulses other than current controlled pulses, such as motor speed control pulses, voltage controlled pulses or the like.

The invention claimed is:

1. An electric pulse tool which delivers torque in pulses on an output shaft of the electric pulse tool, the electric pulse tool comprising:
    an electric motor with a rotor and a gear arrangement adapted to drive the output shaft; and
    a position sensor arranged to determine a position change of the rotor,
    wherein the electrical pulse tool is operative to control a speed of the rotor so that a predetermined speed is reached when the gear arrangement starts to move the output shaft, so that a known kinetic energy for each pulse can be achieved, the speed being determined based on the position change of the rotor determined with the position sensor.

2. The electric pulse tool according to claim 1, wherein it is determined that the gear arrangement starts to move the output shaft based on when the speed of the rotor decreases sufficiently.

3. The electric pulse tool according to claim 2, wherein the electrical pulse tool is further operative to repeat providing pulses until a parameter value associated with a tightening of a screw joint has been reached.

4. The electric pulse tool according to claim 3, wherein the parameter value associated with the tightening of a screw joint is torque.

5. The electric pulse tool according to claim 3, wherein the parameter value associated with the tightening of a screw joint is angle.

6. The electric pulse tool according to claim 1, wherein it is determined that the gear arrangement starts to move the output shaft when torque sensed by a torque senor increases.

7. The electric pulse tool according to claim 6, wherein the electrical pulse tool is further operative to repeat providing pulses until a parameter value associated with a tightening of a screw joint has been reached.

8. The electric pulse tool according to claim 7, wherein the parameter value associated with the tightening of a screw joint is torque.

9. The electric pulse tool according to claim 7, wherein the parameter value associated with the tightening of a screw joint is angle.

10. The electric pulse tool according to claim 1, wherein it is determined when the gear arrangement starts to move the output shaft based on when current provided to the motor increases.

11. The electric pulse tool according to claim 10, wherein the electrical pulse tool is further operative to repeat providing pulses until a parameter value associated with a tightening of a screw joint has been reached.

12. The electric pulse tool according to claim 11, wherein the parameter value associated with the tightening of a screw joint is torque.

13. The electric pulse tool according to claim 1, wherein the electrical pulse tool is further operative to repeat providing pulses until a parameter value associated with a tightening of a screw joint has been reached.

14. The electric pulse tool according to claim 13, wherein the parameter value associated with the tightening of a screw joint is torque.

15. The electric pulse tool according to claim 13, wherein the parameter value associated with the tightening of a screw joint is angle.

16. A method in an electric pulse tool which delivers torque in pulses on an output shaft of the electric pulse tool, the electric pulse tool comprising an electric motor with a rotor and a gear arrangement adapted to drive the output shaft, and the method comprising:
    determining a speed of the rotor based on a position change of the rotor; and
    controlling the speed of the rotor so that a predetermined speed is reached when the gear arrangement starts to move the output shaft, so that a known kinetic energy for each pulse can be achieved.

17. The method according to claim 16, further comprising repeating providing pulses until a parameter value associated with a tightening of a screw joint has been reached.

18. The method according to claim 17, wherein the parameter value associated with the tightening of a screw joint is torque.

19. The method according to claim 17, wherein the parameter value associated with the tightening of a screw joint is angle.

20. A non-transitory computer-readable storage medium storing a computer program which is executable by an electric pulse tool which delivers torque in pulses on an output shaft of the electric pulse tool, the electric pulse tool comprising an electric motor with a rotor and a gear arrangement adapted to drive the output shaft, and the program being executable by the computer to control the electric pulse tool to perform operations comprising:
    determining a speed of the rotor based on a position change of the rotor; and
    controlling the speed of the rotor so that a predetermined speed is reached when the gear arrangement starts to move the output shaft, so that a known kinetic energy for each pulse can be achieved.

* * * * *